C. V. ROBERTS.
BURNER FOR BROILER OVENS OF GAS RANGES.
APPLICATION FILED MAR. 10, 1916.
1,201,984.
Patented Oct. 17, 1916.
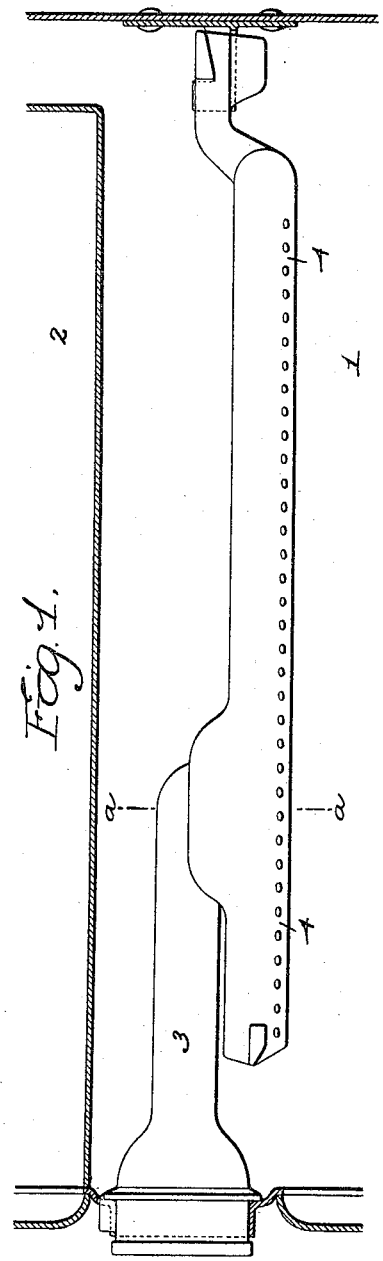
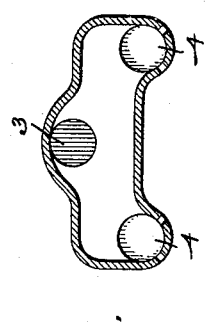
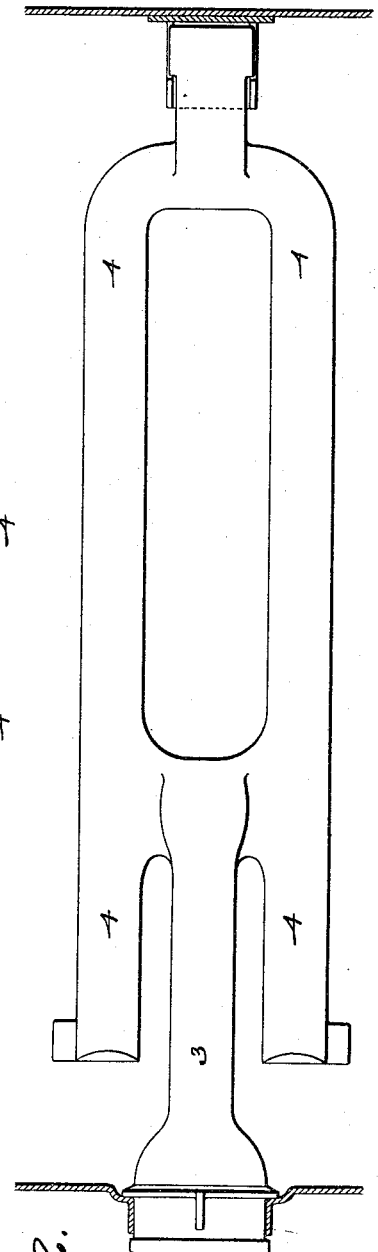
INVENTOR
CLARENCE V. ROBERTS
BY HIS ATTORNEY
Harry Smith

UNITED STATES PATENT OFFICE.

CLARENCE V. ROBERTS, OF PHILADELPHIA, PENNSYLVANIA, ASSIGNOR TO ROBERTS & MANDER STOVE COMPANY, OF PHILADELPHIA, PENNSYLVANIA, A CORPORATION OF PENNSYLVANIA.

BURNER FOR BROILER-OVENS OF GAS-RANGES.

1,201,984.     Specification of Letters Patent.     Patented Oct. 17, 1916.

Application filed March 10, 1916. Serial No. 83,267.

*To all whom it may concern:*

Be it known that I, CLARENCE V. ROBERTS, a citizen of the United States, residing in Philadelphia, Pennsylvania, have invented certain Improvements in Burners for Broiler-Ovens of Gas-Ranges, of which the following is a specification.

The object of my invention is to so construct the burner used in connection with the broiler oven of a gas range as to expedite the broiling operations conducted in said oven, an object which I attain in the manner hereinafter set forth, reference being had to the accompanying drawing, in which—

Figure 1 is a transverse sectional view of sufficient of the oven structure of a gas range to illustrate my invention; Fig. 2 is a top view of the burner for the broiler oven removed from the latter, and Fig. 3 is a transverse section on the line *a—a*, Fig. 2.

In Fig. 1 of the drawing, 1 represents the lower or broiler oven of a gas range and 2 part of the upper or baking oven thereof. When the mixing tubes 3 for the burners which heat these ovens pass through that portion of the front plate of the oven structure which is between the two ovens the perforated burner tube 4 for the broiler oven, if disposed as usual in the same horizontal plane as the mixing tube 3 is relatively remote from articles of food introduced into the broiler oven, and a large percentage of the heat of the gas flames is wasted. In order to overcome this objection I disposed the perforated tube or tubes 4 of the burner below the plane of the mixing tube 3, the perforated portion of said burner tube or tubes being at or below the top of the door opening at the front of the oven, whereby the flames are relatively close to an article of food resting upon the oven grate and the broiling operation can be quickly performed.

In the drawing I have shown the broiler as provided with two perforated tubes 4 disposed one on each side of the mixing tube 3, and in order to provide the desired length of mixing tube without correspondingly contracting the length of the broiler tubes the connection between said mixing tube and broiler tubes is some distance in advance of the front ends of the latter, and in order to insure a more perfect admixture of the air and gas entering the broiler tubes from the mixing tube those portions of the broiler tubes which communicate with the mixing tube are increased in cross sectional area, as shown in Fig. 3.

I claim:—

1. The combination, in a gas range, of a longitudinally extending and perforated broiler with a tube for supplying a mixture of gas and air thereto, said broiler being in a lower plane than the mixing tube and the latter being parallel with the broiler but overlapping the same so as to communicate therewith at a point some distance inwardly from its front end.

2. The combination, in a gas range, of a longitudinally extending and perforated broiler with a tube for supplying a mixture of gas and air thereto, said broiler being in a lower plane than the mixing tube and comprising a pair of parallel tubes, said mixing tube overlapping the said broiler tubes and being disposed parallel therewith and midway between the same so as to communicate with said tubes at a point some distance inwardly from their front ends.

3. The combination, in a gas range, of a longitudinally extending and perforated broiler with a tube for supplying a mixture of gas and air thereto, said broiler being in a lower plane than the mixing tube and consisting of a pair of parallel tubes, and said mixing tube overlapping said broiler tubes and being disposed parallel therewith and midway between the same so as to communicate therewith at a point some distance inwardly from their front ends, and a transverse connection between said broiler tubes and said mixing tube, said transverse connection having a greater cross sectional area than either of said tubes.

In testimony whereof, I have signed my name to this specification, in the presence of two subscribing witnesses.

CLARENCE V. ROBERTS.

Witnesses:
   KATE A. BEADLE,
   HAMILTON D. TURNER.

Copies of this patent may be obtained for five cents each, by addressing the "Commissioner of Patents, Washington, D. C."